US010549785B2

(12) United States Patent
Lee et al.

(10) Patent No.: US 10,549,785 B2
(45) Date of Patent: Feb. 4, 2020

(54) COLLISION LOAD MULTI-DECENTRALIZATION TYPE SIDE BODY FRAME AND VEHICLE INCLUDING THE SAME (71) Applicants: Hyundai Motor Company, Seoul (KR); Kia Motors Corporation, Seoul (KR)

(72) Inventors: Hae-Hoon Lee, Gyeonggi-do (KR); Yong-Bai Joo, Seoul (KR); Sung-Gae Wee, Gyeonggi-do (KR); Dae-Myoung Park, Gyeonggi-do (KR); Won-Gun Kim, Seoul (KR); Jin-Sung Lee, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 121 days.

(21) Appl. No.: 15/838,985

(22) Filed: Dec. 12, 2017

(65) Prior Publication Data
US 2019/0106154 A1   Apr. 11, 2019

(30) Foreign Application Priority Data
Oct. 11, 2017   (KR) .................. 10-2017-0129389

(51) Int. Cl.
*B62D 25/04*   (2006.01)
*B62D 21/15*   (2006.01)
(52) U.S. Cl.
CPC ............. *B62D 25/04* (2013.01); *B62D 21/15* (2013.01)

(58) Field of Classification Search
CPC ......................... B62D 25/04; B62D 25/025
USPC .............. 296/187.09, 187.1, 187.12, 193.06, 296/193.05, 203.03, 209
See application file for complete search history.

(56) References Cited

U.S. PATENT DOCUMENTS

| 2014/0054926 A1* | 2/2014 | Pyun | B62D 25/04 296/187.09 |
| 2015/0166112 A1* | 6/2015 | Chung | B62D 25/08 296/187.1 |
| 2015/0352929 A1* | 12/2015 | Brar | B60J 5/0431 296/187.12 |
| 2016/0016612 A1* | 1/2016 | Torikawa | B62D 25/025 280/784 |
| 2016/0082814 A1* | 3/2016 | Mori | B62D 25/04 296/146.11 |
| 2017/0313358 A1* | 11/2017 | Narahara | B62D 25/04 |

(Continued)

FOREIGN PATENT DOCUMENTS

JP   2014-080182 A   5/2014

*Primary Examiner* — Jason S Morrow
(74) *Attorney, Agent, or Firm* — Mintz Levin Cohn Ferris Glovsky and Popeo, P.C.; Peter f. Corless (57) ABSTRACT A side body frame of a vehicle includes a collision load decentralization member coupled to an A pillar of a side outer panel, the A pillar being divided into a lower reinforcement part, an intermediate reinforcement part, and an upper reinforcement part, where the collision load decentralization member decentralizes a collision load transferred from a tire by a collision deformation to a door load decentralization flow path passing through the intermediate reinforcement part and a side sill load decentralization flow path passing through the lower reinforcement part.

10 Claims, 10 Drawing Sheets (56) References Cited

U.S. PATENT DOCUMENTS

2019/0031243 A1\* 1/2019 Iyoshi .................... B62D 25/04
2019/0070938 A1\* 3/2019 Murata ................ B23K 20/129

\* cited by examiner

COLLISION LOAD MULTI-DECENTRALIZATION TYPE SIDE BODY FRAME AND VEHICLE INCLUDING THE SAME

CROSS-REFERENCE(S) TO RELATED APPLICATION

This application claims under 35 U.S.C. § 119(a) the benefit of Korean Patent Application No. 10-2017-0129389, filed on Oct. 11, 2017, the entire contents of which are incorporated herein by reference.

BACKGROUND (a) Technical Field

Exemplary embodiments of the present disclosure relate to a side body frame, and particularly, to a vehicle including a collision load multi-decentralization type side body frame which is capable of preventing local load concentration by an input load concentrated portion in case of a collision.

(b) Description of Related Art

In general, a vehicle must satisfy the requirements for a head-on test, an offset test, a small overlap test and an oblique test.

For example, compared to the head-on test, the offset test is designed to replicate what happens when the front corner of a vehicle collides with another vehicle or object, the small overlap test is designed to replicate what happens when the front corner of a vehicle at the driver's seat collides with another vehicle or object, and the oblique test is designed to replicate what happens when the vehicle obliquely collides with another vehicle or object.

Therefore, the body structure of the vehicle must satisfy the requirements for the head-on test, the offset test, the small overlap test and the oblique test. In conjunction with the requirements, a front body reinforcement structure is applied to a side body frame of the vehicle. The side body frame refers to a side frame of the vehicle. In the case of a car, the front side of a B pillar serving as the middle section is set to an A pillar, and the rear side of the B pillar is set to a C pillar. Further, a space between the A and B pillars is used for a front door mounting space, and a space between the B and C pillars is used for a rear door mounting space. The lower frame of the A, B and C pillars is connected to the bottom of the vehicle body, and the upper frame of the A, B and C pillars is connected to a roof panel.

For example, the A pillar section of the side body frame is reinforced through a front rigid member implemented by a side sill member and a separate rigid bracket, and the front rigid member serves as the front body reinforcement structure for reducing deformation of the A pillar section.

As a result, the front body reinforcement structure ensures safety against deformation of the A pillar section, which is caused by an actual vehicle collision, thereby preventing an injury of a driver in the vehicle.

However, the small overlap test additionally requires a test for a passenger's seat as well as a driver's seat. Thus, there is demand for improvement of the front body reinforcement structure focused on the small overlap test for a passenger's seat.

In particular, although a vehicle to which a one-piece, hot-stamped side body frame is applied includes the front body rigidity reinforcement structure implemented by the front rigid member, the vehicle may not satisfy the requirements for a small overlap test, because the body structure of a tire collision portion during the small overlap test is not rigid due to the structural characteristics of the one-piece, hot-stamped side body frame formed as one structural reinforcement member. Therefore, the structure needs to be improved in order to satisfy the requirements for the small overlap test for a passenger's seat.

Further, the lack in rigidity of the body structure of the tire collision portion of the vehicle to which the one-piece, hot-stamped side body frame is applied may cause an increase in deformation of the A pillar section due to a tire factor including the size of a tire mounted on the vehicle. In this case, a body grade difference between small overlap tests may occur. Thus, there is an urgent demand for a rigid body structure which can satisfy a passenger seat collision condition which is more severe than a driver's seat collision condition.

SUMMARY

An embodiment of the present disclosure is directed to a collision load multi-decentralization type side body frame which can maintain the rigidity of a vehicle body structure by expanding an overlap area between parts such that a tire collision load does not form local load concentration in case of a collision, and satisfy the requirements for small overlap tests for a driver's seat and passenger's seat through a load decentralization path which minimizes a collision deviation depending on tire size, and a vehicle including the same.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an embodiment of the present disclosure, there is provided a side body frame including a collision load decentralization member coupled to an A pillar of a side outer panel, the A pillar being divided into a lower reinforcement part, an intermediate reinforcement part and an upper reinforcement part, wherein the collision load decentralization member decentralizes a collision load transferred from a tire by a collision deformation to a door load decentralization flow path passing through the intermediate reinforcement part and a side sill load decentralization flow path passing through the lower reinforcement part.

The side outer panel may include a one-piece, hot-stamped structure. The collision load decentralization member is coupled to the A pillar through a fixing force of welding and bolting.

The collision load decentralization member may include a front pillar bracket, a lower hinge reinforcement bracket and a side sill reinforcement bracket, which are coupled to the A pillar and have different sizes.

The front pillar bracket may be located at side surfaces of the lower reinforcement part, the intermediate reinforcement part and the upper reinforcement part and attached on the intermediate reinforcement part, the lower hinge reinforcement bracket may be located at the side surfaces of the lower reinforcement part and the intermediate reinforcement part and attached on the intermediate reinforcement part, and the side sill reinforcement bracket may be attached on the lower reinforcement part. The lower reinforcement part may form a lower overlap area which is welded as a stacked structure of the lower hinge reinforcement bracket and the side sill reinforcement bracket, and the intermediate reinforcement part may form an intermediate overlap area which is welded and bolt-fastened as a stacked structure of the front pillar bracket and the lower hinge reinforcement bracket.

The collision load decentralization member may include a front pillar bracket, a lower hinge reinforcement bracket, a side sill reinforcement bracket and an upper hinge reinforcement bracket, which are coupled to the A pillar and have different sizes.

The collision load decentralization member decentralizes the collision load to a roof load decentralization flow path passing through the upper reinforcement part, in addition to the door load decentralization flow path and the side sill load decentralization flow path.

The front pillar bracket may be located at side surfaces of the lower reinforcement part, the intermediate reinforcement part and the upper reinforcement part and attached on the intermediate reinforcement part and the upper reinforcement part, the lower hinge reinforcement bracket may be located at the side surfaces of the lower reinforcement part and the intermediate reinforcement part and attached on the intermediate reinforcement part, the side sill reinforcement bracket may be attached on the lower reinforcement part, and the upper hinge reinforcement bracket may be attached on the upper reinforcement part. The lower reinforcement part may form a lower overlap area which is welded as a stacked structure of the lower hinge reinforcement bracket and the side sill reinforcement bracket, the intermediate reinforcement part may form an intermediate overlap area which is welded and bolt-fastened as a stacked structure of the front pillar bracket and the lower hinge reinforcement bracket, and the upper reinforcement part forms an upper overlap area which is welded and bolt-fastened as a wrapped structure between the front pillar bracket and the upper hinge reinforcement bracket, the wrapped structure being formed by coupling a U-shaped cross-sectional structure of the front pillar bracket to the upper hinge reinforcement bracket.

The A pillar may be coupled to a door beam, and the door beam may be inclined upward at an acute beam inclination angle from the intermediate reinforcement part.

In accordance with another embodiment of the present disclosure, there is provided a vehicle including: a side body frame having a collision load decentralization member coupled thereto, the collision load decentralization member decentralizing a collision load transferred from a tire by a collision deformation to a door load decentralization flow path and a side sill load decentralization flow path at separate locations; a door constituting the side body frame, mounted on an A pillar of a side outer panel to which the collision load decentralization member is coupled, and connecting the door load decentralization flow path; and a side sill mounted on a side sill frame of the side outer panel, and connecting the side sill load decentralization flow path.

The collision load decentralization member may further form a roof load decentralization flow path for decentralizing the collision load to a roof frame of the side outer panel, and the door load decentralization flow path, the side sill load decentralization flow path and the roof load decentralization flow path may be formed in three directions at locations separated from each other.

The collision load decentralization member may include a plurality of brackets which overlap each other and have different sizes.

The side body frame may include a one-piece, hot-stamped structure.

DESCRIPTION OF SPECIFIC EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like.

Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Exemplary embodiments of the present disclosure will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present disclosure.

Figure 1:
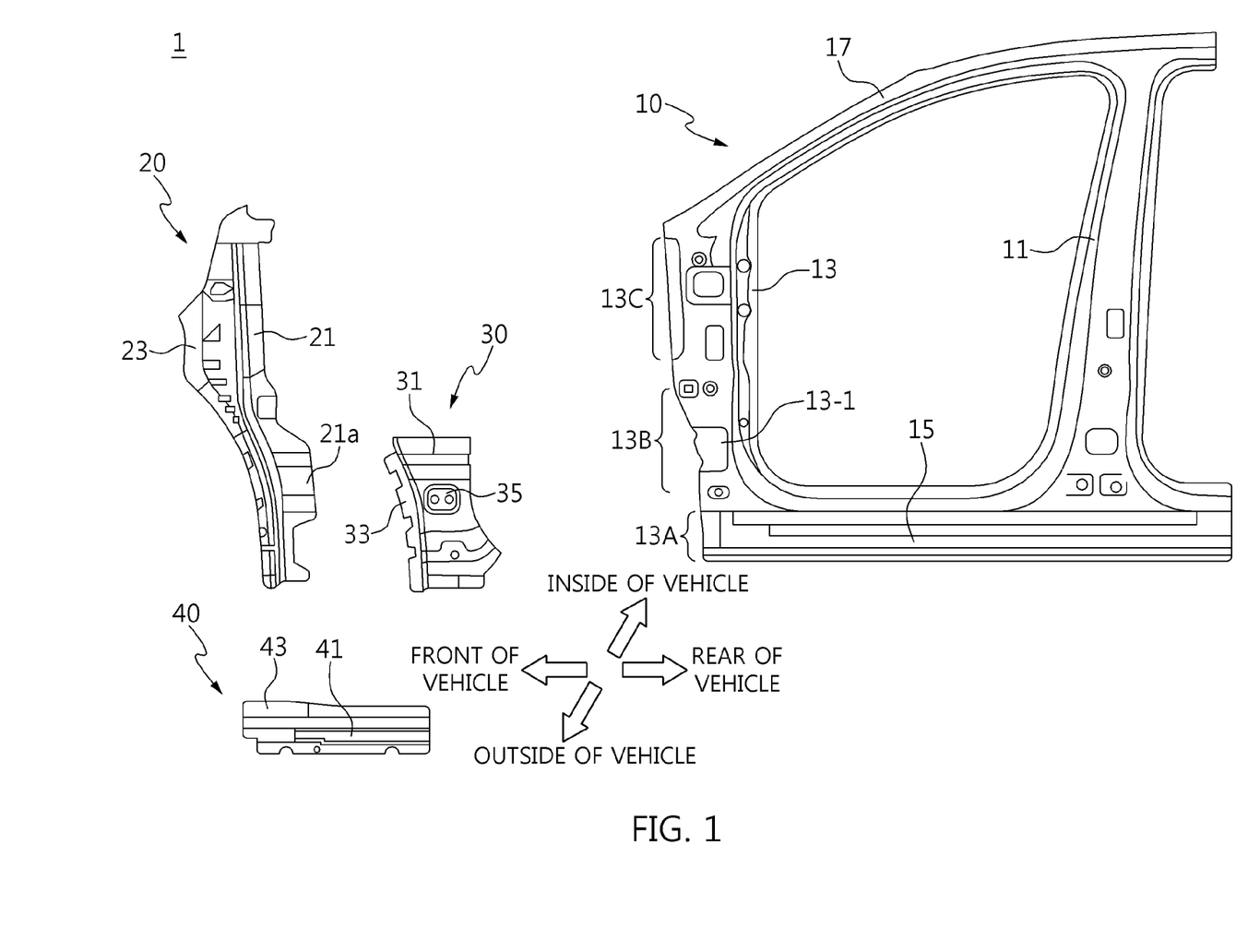
FIG. 1 is an exploded view of a collision load multi-decentralization type side body frame in accordance with an embodiment of the present disclosure.
Figure 2:
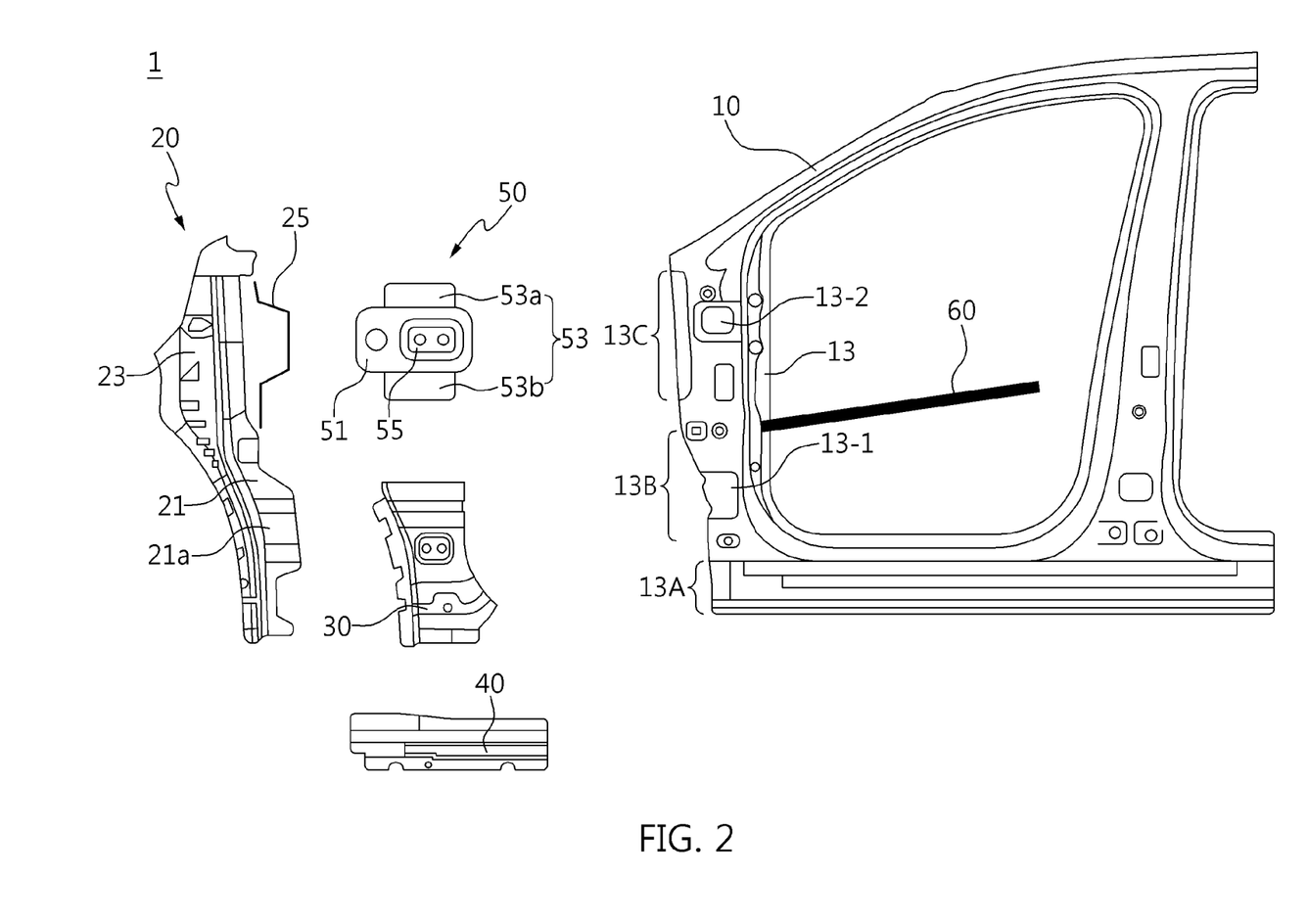
FIG. 2 is an expanded view of the collision load multi-decentralization type side body frame in accordance with the embodiment of the present disclosure.

FIGS. 1 and 2 illustrate a collision load decentralization member that provides a collision load multi-decentralization structure to a side body frame 1. In this case, the side body frame 1 includes a side outer panel 10 as a basic component, which is manufactured as a one-piece, hot-stamped structure, and the side outer panel 10 is coupled to other side panels (not illustrated). The one-piece, hot-stamped structure indicates a structure manufactured through a weight reduction technique for forming side structural reinforcement members as one piece.

For example, the collision load multi-decentralization member of FIG. 1 is a bottom-focused collision load multi-decentralization member, and includes the side outer panel 10, a front pillar bracket 20, a lower hinge reinforcement bracket 30 and a side sill reinforcement bracket 40. On the other hand, the collision load multi-decentralization member of FIG. 2 is a top/bottom-focused collision load multi-decentralization member, and includes the side outer panel 10, the front pillar bracket 20, the lower hinge reinforcement bracket 30 and the side sill reinforcement bracket 40 as common components. The collision load multi-decentralization member of FIG. 1 further includes an upper hinge reinforcement bracket 50 and a door beam 60.

The bottom-focused collision load multi-decentralization member increases the coupling rigidity between a side sill and a door lower hinge at the bottom of an A pillar of the side outer panel 10, thereby decentralizing a collision load flow toward a door impact bar and the side sill. On the other hand, the top/bottom-focused collision load multi-decentralization member can increase the coupling rigidity of the upper end of the A pillar through the upper hinge reinforcement bracket 50 in addition to the effect of the bottom-focused collision load multi-decentralization member, and change a load flow to a load flow through the door beam 60, according to the characteristics of the vehicle. The side body frame 1 may apply the bottom-focused collision load multi-decentralization member or the top/bottom-focused collision load multi-decentralization member, in order to maximize the collision absorption efficiency while minimizing deformation of the vehicle body.

Specifically, the side outer panel 10 includes the A pillar 13, a B pillar 11 and a C pillar (not illustrated) which form a side surface of the vehicle, on which a door is mounted. The A pillar is formed at the front of the B pillar 11 formed at the intermediate position, and the C pillar is formed at the rear of the B pillar 11. The side outer panel 10 includes a side sill frame 15 serving as a lower connection part and a roof frame 17 serving as an upper connection part. The side outer panel 10 is connected to the side sill (not illustrated) through the side sill frame 15, and connected to a roof panel (not illustrated) through the roof frame 17.

In particular, the entire vertical section of the A pillar 13 is divided into a lower reinforcement part 13A, an upper reinforcement part 13C and an intermediate reinforcement part 13B. The lower reinforcement part 13A is connected to the side sill frame 15 and has a side sill reinforcement bracket 40 attached thereon, the upper reinforcement part 13C is connected to the roof frame 17 and has the upper hinge reinforcement bracket 50 attached thereon, and the intermediate reinforcement part 13B is located between the lower reinforcement part 13A and the upper reinforcement part 13C and has the lower hinge reinforcement bracket 30 attached thereon. In this case, the intermediate reinforcement part 13B has a lower bolting surface 13-1 through which the lower hinge reinforcement bracket 30 is bolt-fastened, and the upper reinforcement part 13C has an upper bolting surface 13-2 through which the upper hinge reinforcement bracket 50 is bolt-fastened.

Therefore, the side outer panel 10 includes the bottom-focused collision load multi-decentralization member as a rigidity reinforcement structure for the lower reinforcement part 13A and the intermediate reinforcement part 13B of the A pillar 13, or includes the top/bottom-focused collision load multi-decentralization member as a rigidity reinforcement structure for the lower reinforcement part 13A, the intermediate reinforcement part 13B and the upper reinforcement part 13C of the A pillar 13.

Specifically, as illustrated in FIG. 1, the front pillar bracket 20 includes a bearing surface body 21 and a side surface body 23 in order to constitute the bottom-focused collision load multi-decentralization member. The side surface body 23 is bent from one side of the bearing surface body 21 and thus has a level difference from the bearing surface body 21. Alternatively, as illustrated in FIG. 2, the front pillar bracket 20 includes a bearing surface body 21, a side surface body 23 and an extended body 25 in order to constitute the top/bottom-focused collision load multi-decentralization member. The side surface body 23 is bent from one side of the bearing surface body 21 and thus has a level difference from the bearing surface body 21, and the extended body 25 is extended from the other side of the bearing surface body 21 so as to protrude from the bearing surface body 21.

In particular, the bearing surface body 21 is positioned at a side surface of the entire vertical section of the A pillar 13, the side surface body 23 is attached on the lower reinforcement part 13A and the intermediate reinforcement part 13B of the A pillar 13, and the extended body 25 is attached on the upper reinforcement part 13C of the A pillar 13. The bearing surface body 21 has a seating surface 21A formed thereon, and the seating surface 21A forms a bolt-fastening portion of the lower hinge reinforcement bracket 30 attached on the bearing surface body 21. The extended body 25 is extended with a U-shaped cross-sectional structure, and covers the upper hinge reinforcement bracket 50 with the U-shaped cross-sectional structure.

Specifically, the lower hinge reinforcement bracket 30 includes an overlap bearing surface body 31 and an overlap side surface body 33 which is bent from one side of the overlap bearing surface body 31 and thus has a level difference from the overlap bearing surface body 31. In particular, the overlap bearing surface body 31 has a contact surface 35 formed thereon, and the contact surface 35 is attached on the bearing surface body 21 of the front pillar bracket 20 such that the lower hinge reinforcement bracket 30 is bolt-fastened to the intermediate reinforcement part 13B of the A pillar 13 through the contact surface 35.

The side sill reinforcement bracket 40 includes a side sill body 41 and an overlap extended body 43 which is bent upward from the side sill body 41 and thus has a level difference from the side sill body 41. In particular, the side sill body 41 is attached on the side sill frame 15 of the side outer panel 10, and the overlap extended body 43 is attached on a part of the overlap bearing surface body 31 of the lower hinge reinforcement bracket 30 at the A pillar 13 of the side outer panel 10.

The upper hinge reinforcement bracket 50 includes a connection body 51 and a seating flange 53 which is bent from the connection body 51 and has a level difference from the connection body 51. In particular, the connection body 51 has a bolting bearing surface 55 formed thereon, and the bolting bearing surface 55 is attached on the extended body 25 of the front pillar bracket 20 such that the upper hinge reinforcement bracket 50 is bolt-fastened to the upper reinforcement part 13C of the A pillar 13 through the bolting bearing surface 55. The seating flange 53 includes an upper seating flange 53a bent upward from the connection body 51 and a lower seating flange 53b bent downward from the connection body 51.

The door beam 60 is welded to the A pillar 13 and the B pillar 11, and forms an acute beam inclination angle from the A pillar 13 toward the B pillar 11.

Figure 3:
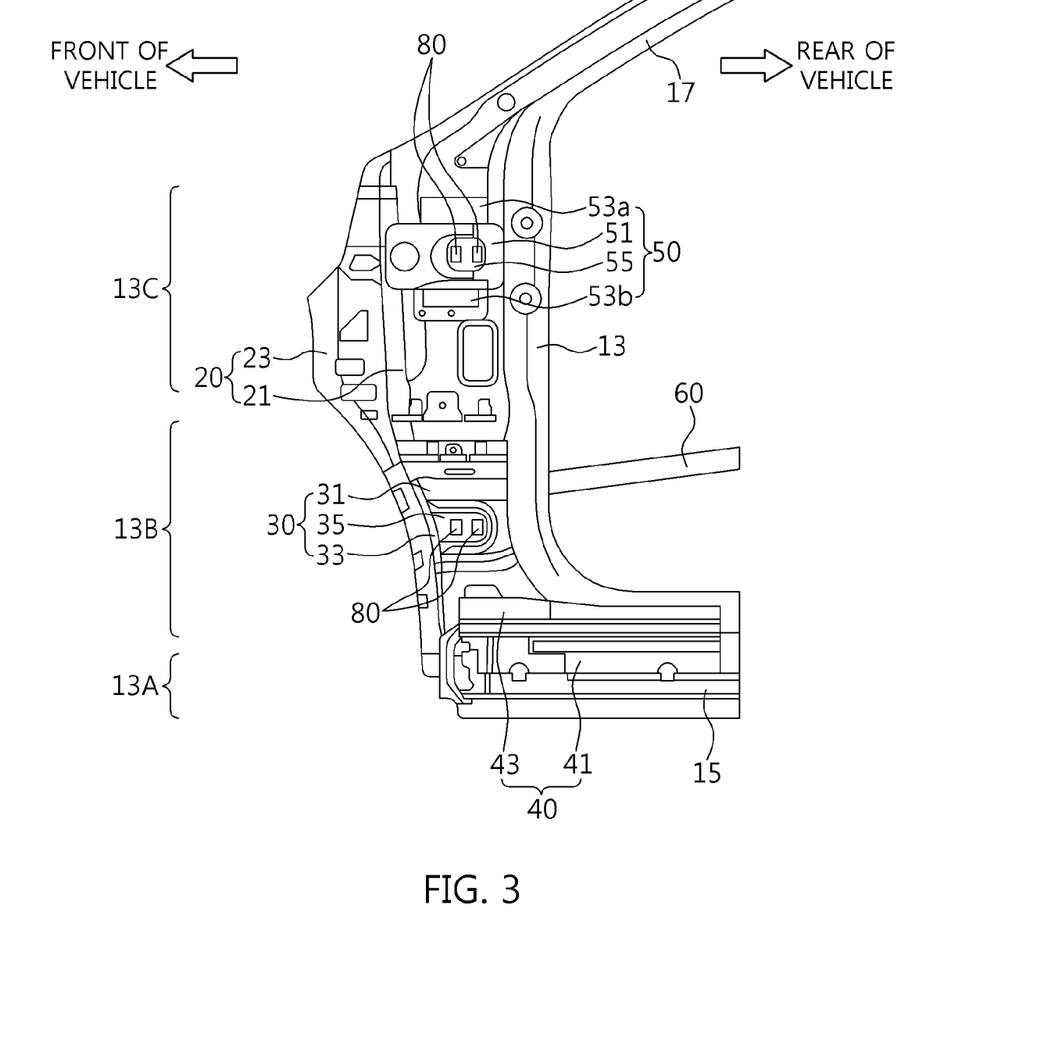
FIG. 3 is an assembled view of the collision load multi-decentralization type side body frame in accordance with the embodiment of the present disclosure.

FIG. 3 illustrates that the top/bottom-focused collision load multi-decentralization member is assembled to the side body frame 1. As illustrated in FIG. 3, the front pillar bracket 20, the lower hinge reinforcement bracket 30, the side sill reinforcement bracket 40 and the upper hinge reinforcement bracket 50 are integrated with the side outer panel 10 through the A pillar 13, and the door beam 60 is connected from the A pillar 13 to the B pillar 11 while forming an acute beam inclination angle.

Therefore, the front pillar bracket 20, the lower hinge reinforcement bracket 30, the side sill reinforcement bracket 40, the upper hinge reinforcement bracket 50 and the door beam 60 are operated as follows. Hereafter, overlap areas among the brackets 20 to 50 are divided into a lower overlap area formed in the lower reinforcement part 13A of the A pillar 13, an intermediate overlap area formed in the intermediate reinforcement part 13B, and an upper overlap area formed in the upper reinforcement part 13C.

Since the front pillar bracket 20 and a side portion of the A pillar 13 are covered by the lower reinforcement part 13A, the intermediate reinforcement part 13B and the upper reinforcement part 13C, the front pillar bracket 20 serves as a collision reinforcement member that absorbs energy and decentralizes a collision load in case of a collision. In particular, the front pillar bracket 20 not only uniformly decentralizes upper and lower loads of the side outer panel 10 through one or more bolting hinge connection structures for the lower hinge reinforcement bracket 30 and the upper hinge reinforcement bracket 50, but also provides durability to prevent door sagging.

The lower hinge reinforcement bracket 30 is attached on the bearing surface body 21 of the front pillar bracket 20 in the lower reinforcement part 13A and the intermediate reinforcement part 13B of the A pillar 13, and thus serves as a collision reinforcement member that absorbs energy and forms a collision load decentralization path in case of a collision.

The side sill reinforcement bracket 40 is attached on the overlap bearing surface body 31 of the lower hinge reinforcement bracket 30 in the lower reinforcement part 13A of the A pillar 13, and thus serves as a collision reinforcement member that absorbs energy and transfers a collision load toward the side sill in case of a collision.

The upper hinge reinforcement bracket 50 is attached on the extended body 25 of the front pillar bracket 20 in the upper reinforcement part 13C of the A pillar 13, and thus serves as a collision reinforcement member that absorbs energy and decentralizes a collision load in case of a collision. In particular, rigidity can be additionally secured through one or more bolting hinge connection structures for the lower hinge reinforcement bracket 30 and the upper hinge reinforcement bracket 50.

The door beam 60 changes the load flow path to an acute bean inclination angle, thereby contributing to forming a collision load flow according to the characteristics of the vehicle.

Figure 4:
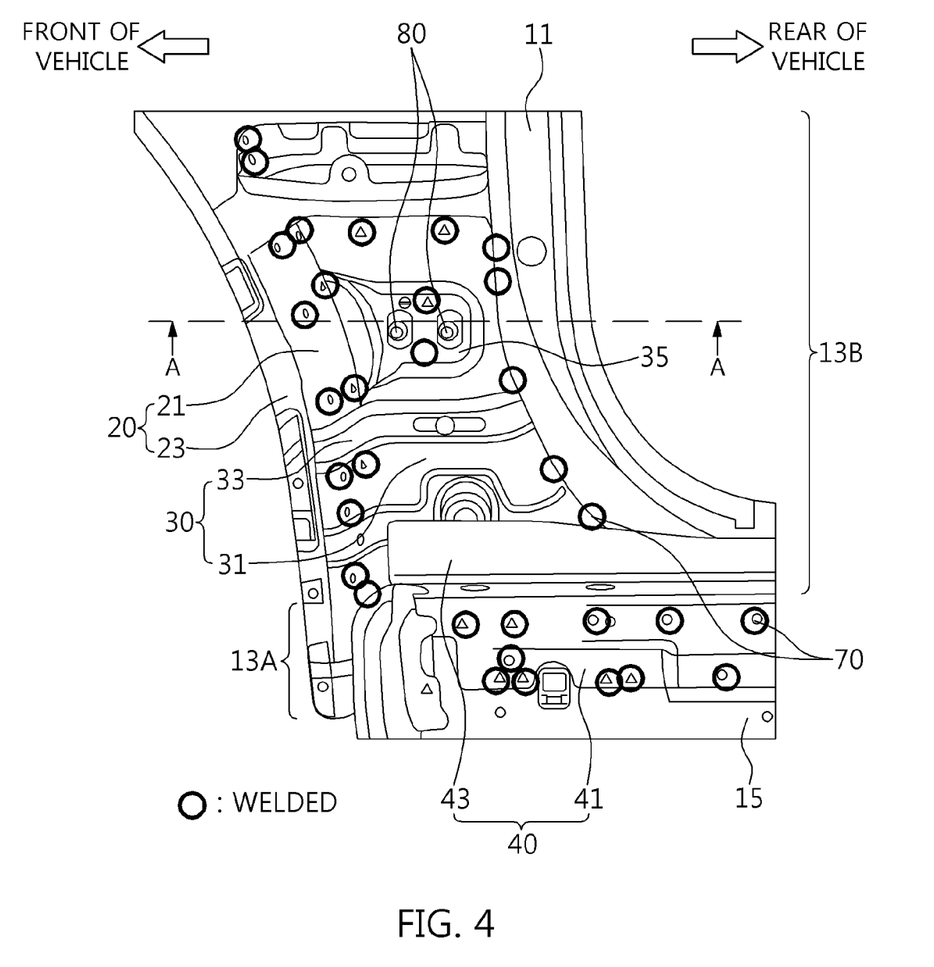
FIG. 4 is an assembled view of a lower portion of the side body frame, on which a tire collision load is concentrated in case of a collision, in accordance with the embodiment of the present disclosure.
Figure 5:
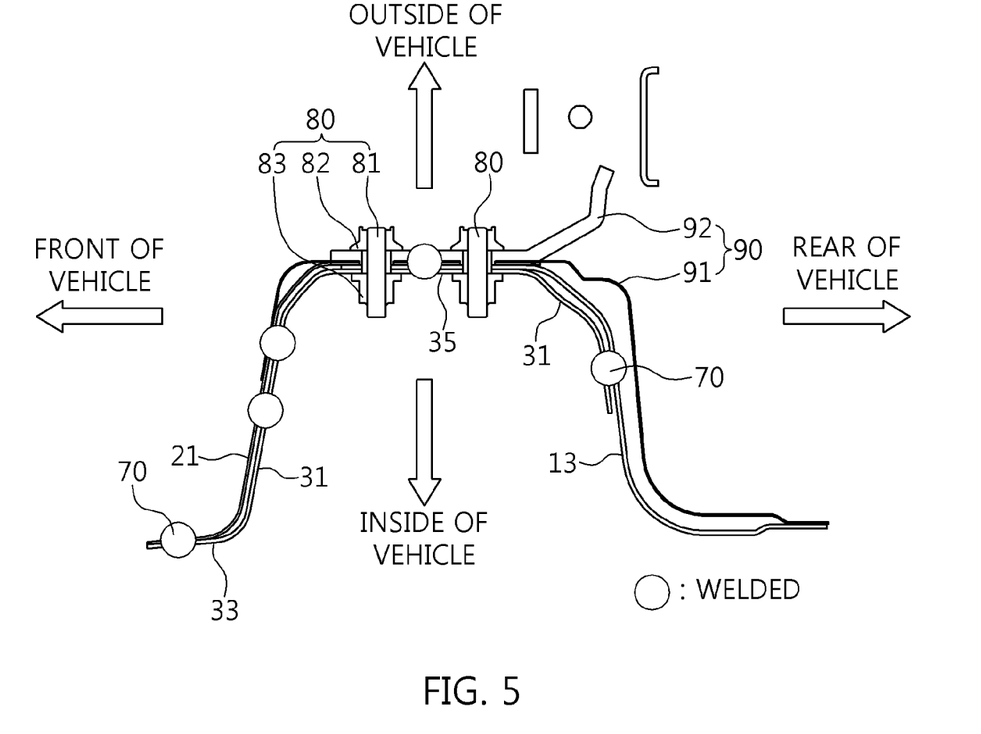
FIG. 5 is a cross-sectional view taken along the line A-A of FIG. 4.

FIGS. 4 and 5 illustrate a fixing structure for the front pillar bracket 20, the lower hinge reinforcement bracket 30 and the side sill reinforcement bracket 40 and a cross-section of the fixing structure. As illustrated in FIGS. 4 and 5, the fixing structure includes a welding structure and a bolting structure, which can significantly increase the coupling rigidity of the lower portion of the A pillar 13 through synergetic effects of welding and bolting. Therefore, at the initial stage of a collision, the collision can be absorbed without a collapse of the lower portion of the A pillar 13 (for example, a tear between parts or a panel crack). In particular, since the transfer and decentralization of a load toward the door beam 60 and the side sill can be increased, the collision absorption effect can be maximized while deformation of the vehicle body is minimized.

Referring to the welding structure of FIGS. 4 and 5, the welding structure includes a plurality of welding points 70.

The welding points 70 are formed at portions where the front pillar bracket 20, the lower hinge reinforcement bracket 30 and the side sill reinforcement bracket 40 overlap each other while being attached on the lower reinforcement part 13A and the intermediate reinforcement part 13B. Further, the welding points 70 are formed at portions where the front pillar bracket 20 and the upper hinge reinforcement bracket 50 overlap each other while being attached on the upper reinforcement part 13C of the A pillar 13.

Referring to the bolting structure of FIGS. 4 and 5, the bolting structure includes a bolt shaft 81, a nut 82 and a bush 83, which form a bolting point 80 for a door panel 90 and the A pillar 13 of the side outer panel 10.

For example, the bolt shaft 81 is disposed through the intermediate reinforcement part 13B (and the upper reinforcement part 13C) of the A pillar 13, the seating surface 21A (and the extended body 25) of the front pillar bracket 20 and the contact surface 35 of the lower hinge reinforcement bracket 30 (and the bolting bearing surface 55 of the upper hinge reinforcement bracket 50) from the door panel 90, and the nut 82 is coupled to the bolt shaft 81 at the door panel 90, and the bush 83 is coupled to the bolt shaft 81 at the lower hinge reinforcement bracket 30 (and the upper hinge reinforcement bracket 50).

Therefore, the bolting points 80 are formed at two locations spaced a predetermined distance from each other, through the intermediate reinforcement part 13B of the A pillar 13, the seating surface 21A of the front pillar bracket 20 and the contact surface 35 of the lower hinge reinforcement bracket 30, and formed at two locations spaced a predetermined distance from each other, through the upper reinforcement part 13C of the A pillar 13, the extended body 25 of the front pillar bracket 20, and the bolting bearing surface 55 of the upper hinge reinforcement bracket 50.

Figure 6:
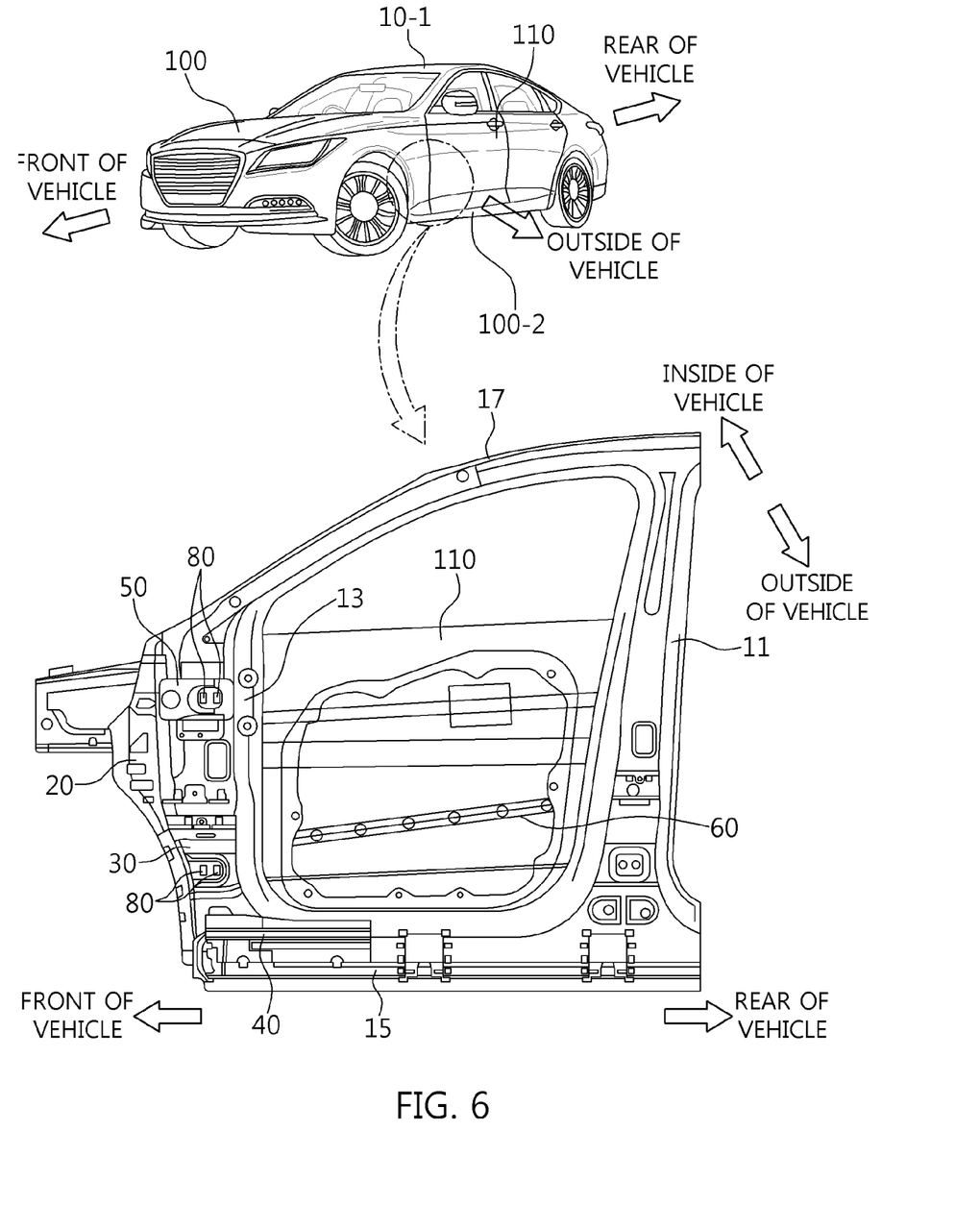
FIG. 6 illustrates a vehicle to which the collision load multi-decentralization type side body frame in accordance with the embodiment of the present disclosure is applied.

FIG. 6 illustrates a vehicle 100 to which the side body frame 1 is applied. As illustrated in FIG. 6, the vehicle 100 includes a roof 100-1 formed at the top of the side body frame 1 and a side sill 100-2 formed at the bottom of the side body frame 1. The side body frame 1 includes a door 110 serving as a space for the A pillar 13, the B pillar 11, the C pillar (not illustrated).

In this case, the side body frame 1 may include the side outer panel 10, the front pillar bracket 20, the lower hinge reinforcement bracket 30 and the side sill reinforcement bracket 40 which form the bottom-focused collision load multi-decentralization member of FIG. 1, or include the side outer panel 10, the front pillar bracket 20, the lower hinge reinforcement bracket 30, the side sill reinforcement bracket 40, the upper hinge reinforcement bracket 50 and the door beam 60 which form the top/bottom-focused collision load multi-decentralization member of FIG. 2.

Thus, as the bolting points 80 of FIG. 5 are applied to the door 110, the door panel 90 composed of a door inner panel 91 and a door outer panel 92 is mounted as a hinge structure in the side body frame 1 at the A pillar 13 of the side outer panel 10.

FIGS. 7 to 10 illustrate a collision load multi-decentralization operation of the collision load decentralization member applied to the side body frame 1 during an oblique test for the vehicle 100. In this case, since the side body frames 1 having the same structure are applied to a driver's seat and a passenger's seat, the result of the oblique test for the driver's seat may be applied to the passenger's seat.

Figure 7:
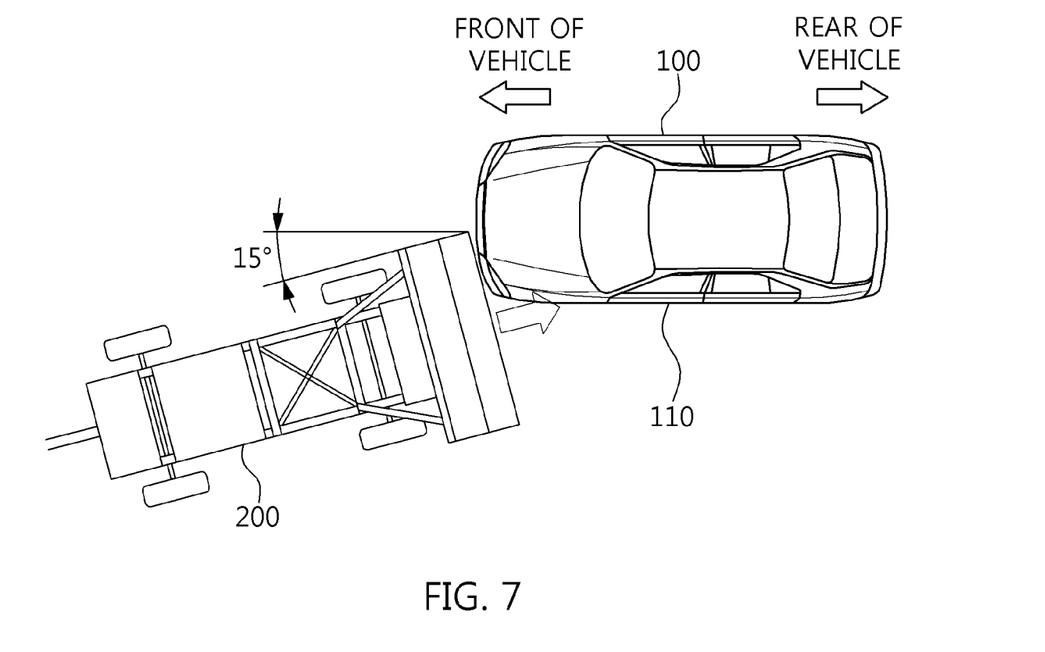
FIG. 7 illustrates that the vehicle in accordance with the embodiment of the present disclosure is subjected to an oblique test.

Referring to FIG. 7, during an oblique test for the vehicle 100 using a collision barrier 200, a collision load $F_{input}$ transferred through a front wheel deforms the side body frame 1 and the door 110, while being inputted through the A pillar 13 serving as a load input point.

Figure 8:
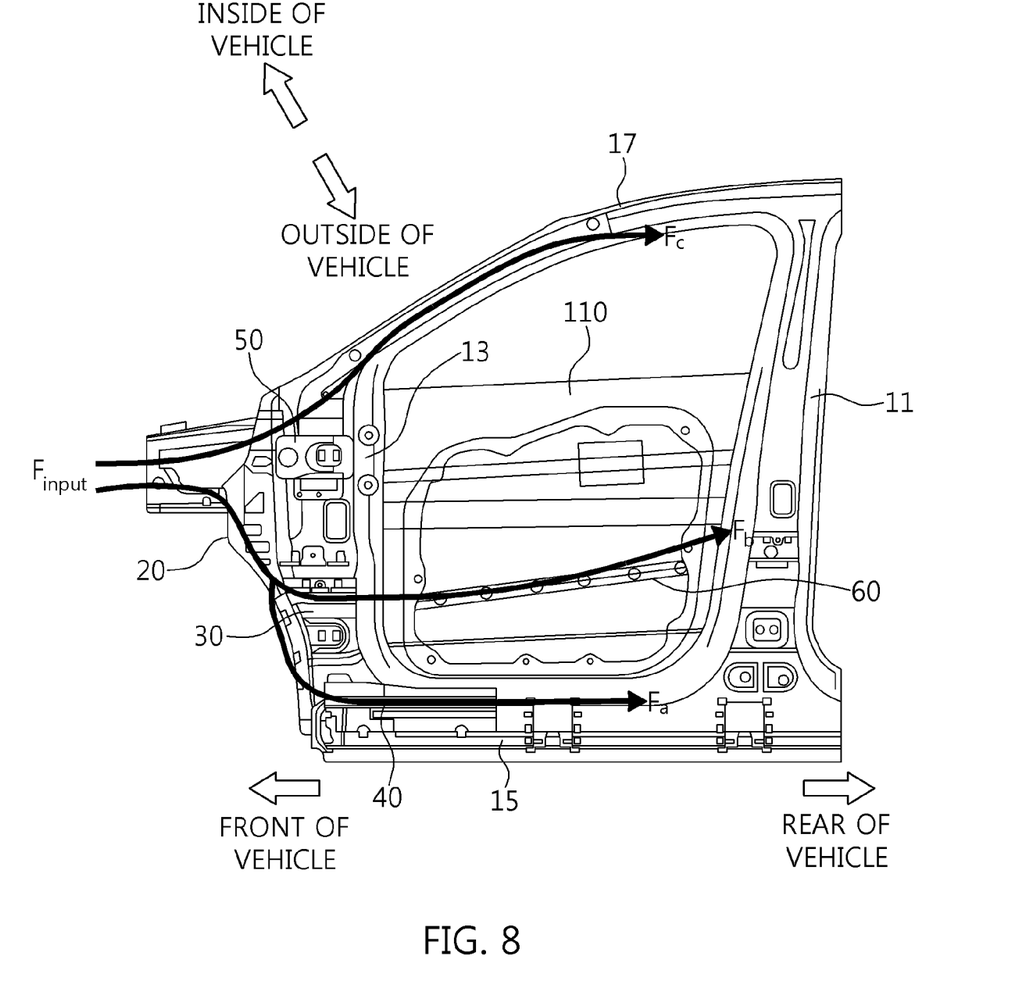
FIG. 8 illustrates that a collision load is decentralized to multiple flow paths by the side body frame in accordance with the embodiment of the present disclosure.

Referring to FIG. 8, the collision load is decentralized through the collision load decentralization member installed in the side body frame 1. That is, the collision load $F_{input}$ transferred to the front pillar bracket 20 through a tire forms a flow path divided into a door load decentralization flow path Fb, a side sill load decentralization flow path Fa and a roof load decentralization flow path Fc, while being inputted through the A pillar 13 of the side outer panel 10 serving as the load input point.

For example, the door load decentralization flow path Fa is formed through the lower hinge reinforcement bracket 30 and the door beam 60, the side sill load decentralization flow path Fb is formed through the lower hinge reinforcement bracket 30 and the side sill reinforcement bracket 40, and the roof load decentralization flow path Fc is formed through the upper hinge reinforcement bracket 50 and the roof frame 17.

Figure 9:
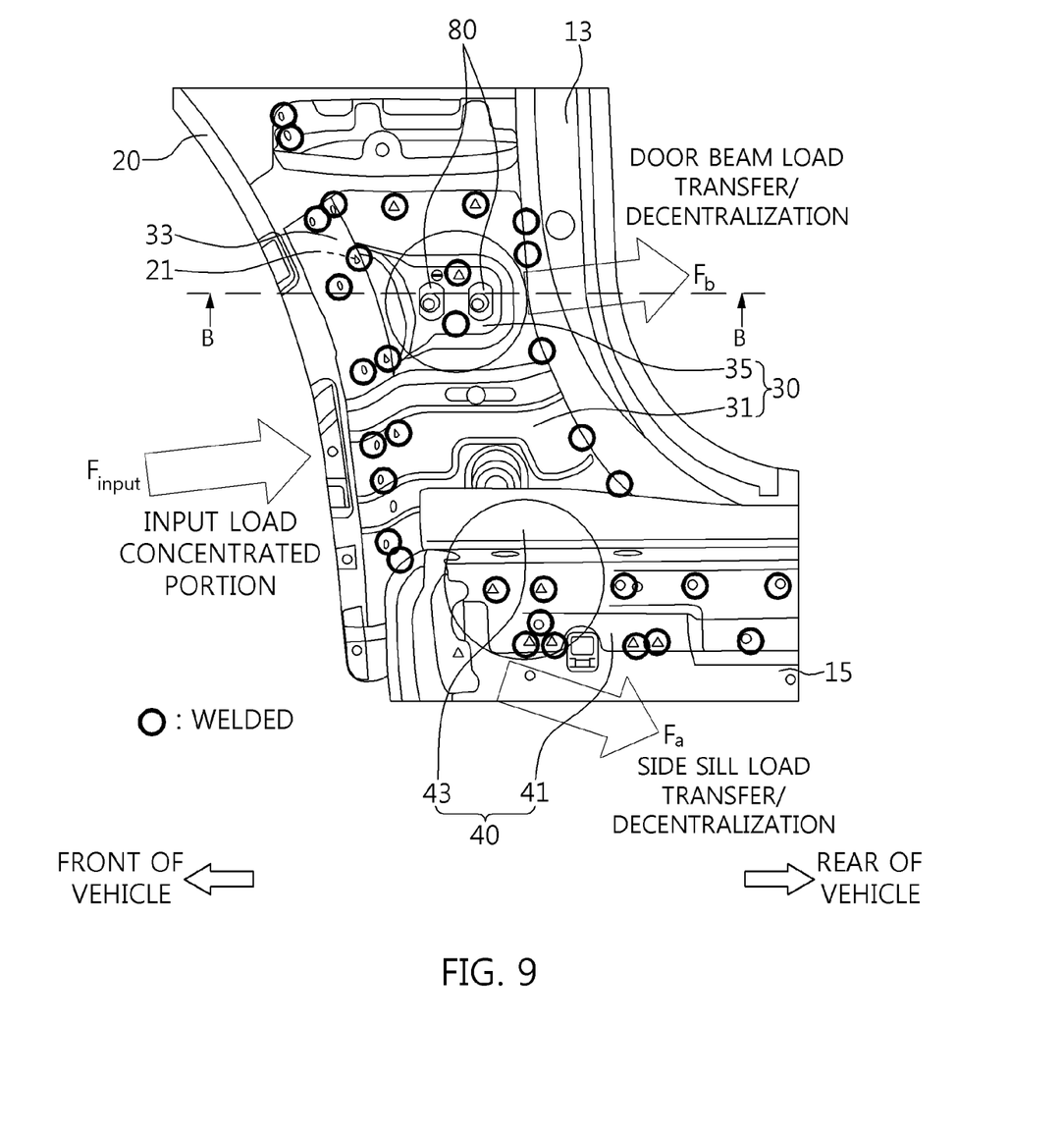
FIG. 9 is illustrates load decentralization paths which are formed in the lower portion of the side body frame in accordance with the embodiment of the present disclosure.
Figure 10:
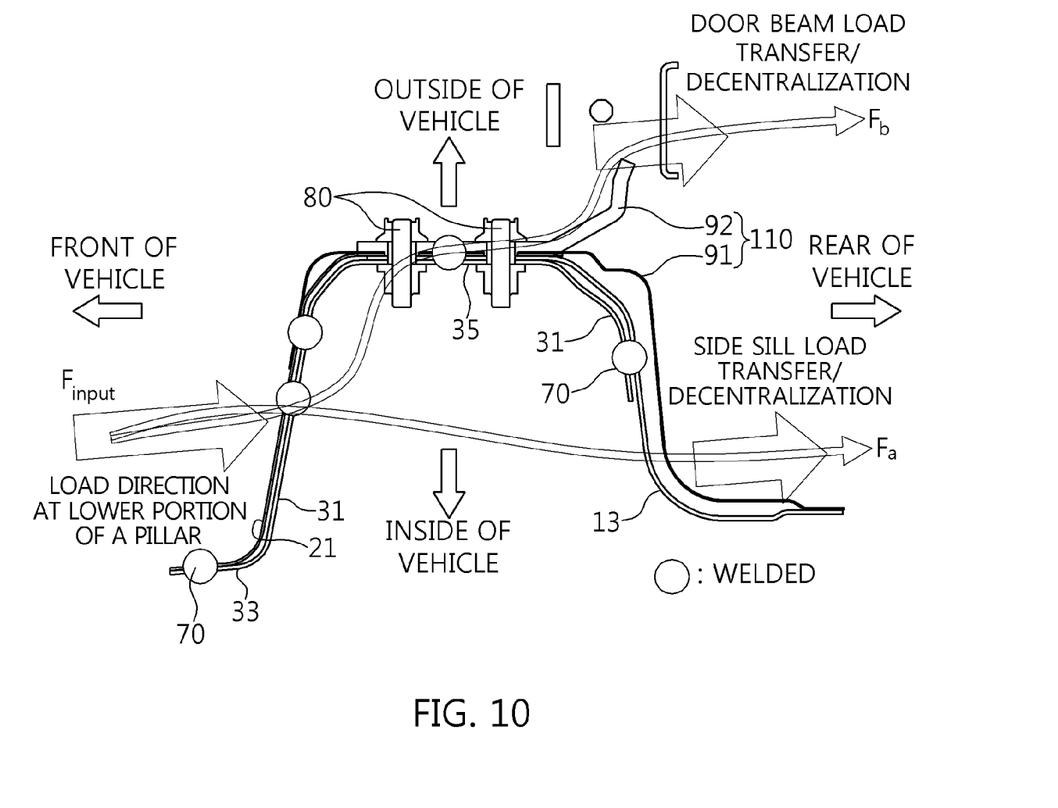
FIG. 10 is a cross-sectional view taken along the line B-B of FIG. 9.

Referring to FIGS. 9 and 10, the welding points 70 of the front pillar bracket 20, the lower hinge reinforcement bracket 30 and the side sill reinforcement bracket 40 and the bolting points 80 of the front pillar bracket 20, the lower hinge reinforcement bracket 30 and the upper hinge reinforcement bracket 50 increase the coupling rigidity of the side outer panel 10 with respect to the lower portion of the A pillar 13.

As a result, the A pillar 13 serving as the load input point transfers and decentralizes the collision load $F_{input}$ toward the door beam 60 through the door load decentralization flow path Fb, and transfers and decentralizes the collision load $F_{input}$ toward the side sill 100-2 through the side sill load decentralization flow path Fa. Thus, even during the oblique test, the A pillar 13 does not collapse due to a tear between parts or a panel crack. Therefore, the side body frame 1 absorbs a part of the collision, and minimizes deformation of the vehicle body, caused by the loads transferred and decentralized toward the side sill 100-2 and the door 2, thereby maximizing the collision absorption efficiency.

In particular, among the components of the collision load decentralization member, the materials and sizes (for example, thicknesses and shapes) of the front pillar bracket 20, the lower hinge reinforcement bracket 30, the side sill reinforcement bracket 40 and the upper hinge reinforcement bracket 50 may be tuned in various manners.

For example, an experimental result shows that the size tuning of the front pillar bracket 20 can reduce the entire weight of the collision load decentralization member and lower the deformation rate of the A pillar 13, thereby not only minimizing a body deformation, but also maximizing the collision absorption efficiency.

As described above, the collision load multi-decentralization type side body frame 1 applied to the vehicle 100 in accordance with the embodiment of the present disclosure includes the A pillar 13 of the side outer panel 10, which is divided into the lower reinforcement part 13A, the intermediate reinforcement part 13B and the upper reinforcement part 13C, and the collision load decentralization member coupled to the A pillar 13A. The collision load decentralization member decentralizes the collision load $F_{input}$ through two paths including the door load decentralization flow path Fa passing through the intermediate reinforcement part 13B and the side sill load decentralization flow path Fb passing through the lower reinforcement part 13A, or decentralizes the collision load $F_{input}$ through three paths including the roof load decentralization flow path Fc passing through the upper reinforcement part 13C in addition to the two paths. Therefore, the overlap areas among the brackets can be expanded to maintain the rigidity of the body structure, thereby satisfying the requirements for the oblique test for the driver's seat and the passenger's seat.

In accordance with the exemplary embodiments of the present disclosure, the overlap areas between the parts which are attached on the A pillar of the side body frame and receive a tire collision load can be expanded to achieve the following effects.

First, it is possible to manufacture a side body frame including a one-piece, hot-stamped side body frame, which satisfies the requirements for a small overlap test for a driver's seat and passenger's seat as well as a head-on test, offset test and oblique test. Second, the side body frame can maximize tire collision load multi-decentralization during a small overlap test, thereby minimizing deformation of the vehicle body. Third, the lower portion of the A pillar through which a collision load is inputted in case of a load is formed as the load concentrated portion of the coupling rigidity increasing structure. Thus, while a load flow is formed toward the door beam and the side sill, load decentralization can be efficiently achieved. Fourth, at the initial stage of a collision, the collision is absorbed without a collapse of the lower portion of the A pillar, and the load is transferred and decentralized toward the door beam and the side sill, thereby minimizing deformation of the vehicle body and maximizing the collision absorption efficiency. Fifth, the coupling rigidity increasing structure of the side body frame is expanded to the upper portion from the lower portion of the A pillar, such that a collision load can be easily decentralized to the upper and lower portions. Sixth, since the scrap part of the one-piece, hot-stamped side body frame is applied to the coupling rigidity increasing structure of the side body frame, the manufacturing cost can be reduced, compared to when a separate part is applied. Seventh, the parts for the coupling rigidity increasing structure have different thicknesses and materials from the side body frame. Thus, when the one-piece, hot-stamped side body frame is applied, a degree of freedom in design can be significantly improved.

While the present disclosure has been described with respect to the specific embodiments, it will be apparent to those skilled in the art that various changes and modifications may be made without departing from the spirit and scope of the disclosure as defined in the following claims.

What is claimed is:

1. A side body frame of a vehicle, comprising:
a collision load decentralization member coupled to an A pillar of a side outer panel, the A pillar being divided into a lower reinforcement part, an intermediate reinforcement part and an upper reinforcement part,
wherein the collision load decentralization member decentralizes a collision load transferred from a tire by a collision deformation to a door load decentralization flow path passing through the intermediate reinforcement part and a side sill load decentralization flow path passing through the lower reinforcement part,
wherein the collision load decentralization member comprises a front pillar bracket, a lower hinge reinforcement bracket, a side sill reinforcement bracket, and an upper hinge reinforcement bracket, which are coupled to the A pillar and have different sizes,
wherein the front pillar bracket is located at side surfaces of the lower reinforcement part, the intermediate reinforcement part, and the upper reinforcement part, the front pillar bracket is attached on the intermediate reinforcement part and the upper reinforcement part, the lower hinge reinforcement bracket is located at the side surfaces of the lower reinforcement part and the intermediate reinforcement part and attached on the intermediate reinforcement part, the side sill reinforcement bracket is attached on the lower reinforcement part, and the upper hinge reinforcement bracket is attached on the upper reinforcement part,
wherein the front pillar bracket includes an extended body having a U-shaped cross-sectional structure configured to cover the upper hinge reinforcement bracket, and
wherein an upper overlap area between the front pillar bracket and the upper hinge reinforcement bracket is formed as a wrapped structure by coupling the extended body to the upper hinge reinforcement bracket.

2. The side body frame of claim 1, wherein the side outer panel comprises a one-piece, hot-stamped structure.

3. The side body frame of claim 1, wherein the collision load decentralization member decentralizes the collision load to a roof load decentralization flow path passing through the upper reinforcement part, in addition to the door load decentralization flow path and the side sill load decentralization flow path.

4. The side body frame of claim 1, wherein the lower reinforcement part forms a lower overlap area between the lower hinge reinforcement bracket and the side sill reinforcement bracket, the intermediate reinforcement part forms an intermediate overlap area between the front pillar bracket and the lower hinge reinforcement bracket, and the upper reinforcement part forms the upper overlap area between the front pillar bracket and the upper hinge reinforcement bracket.

5. The side body frame of claim 4, wherein each of the lower overlap area and the intermediate overlap area is formed as a stacked structure.

6. The side body frame of claim 1, wherein the lower overlap area is welded, and each of the intermediate overlap area and the upper overlap area is welded and bolt-fastened.

7. The side body frame of claim 1, wherein the A pillar is coupled to a door beam, and the door beam is inclined upward at an acute beam inclination angle from the intermediate reinforcement part.

8. A vehicle, comprising:
the side body frame of claim 1, further comprising:
the collision load decentralization member and the side sill load decentralization being arranged at separate locations;
a door constituting the side body frame, mounted on the A pillar of the side outer panel to which the collision load decentralization member is coupled, and connecting the door load decentralization flow path; and
a side sill mounted on a side sill frame of the side outer panel, and connecting the side sill load decentralization flow path.

9. The vehicle of claim 8, wherein the collision load decentralization member further forms a roof load decentralization flow path for decentralizing the collision load to a roof frame of the side outer panel, and the door load decentralization flow path, the side sill load decentralization flow path and the roof load decentralization flow path are formed in three directions at locations separated from each other.

10. The vehicle of claim 8, wherein the side body frame comprises a one-piece, hot-stamped structure.

* * * * *